Patented Mar. 20, 1951

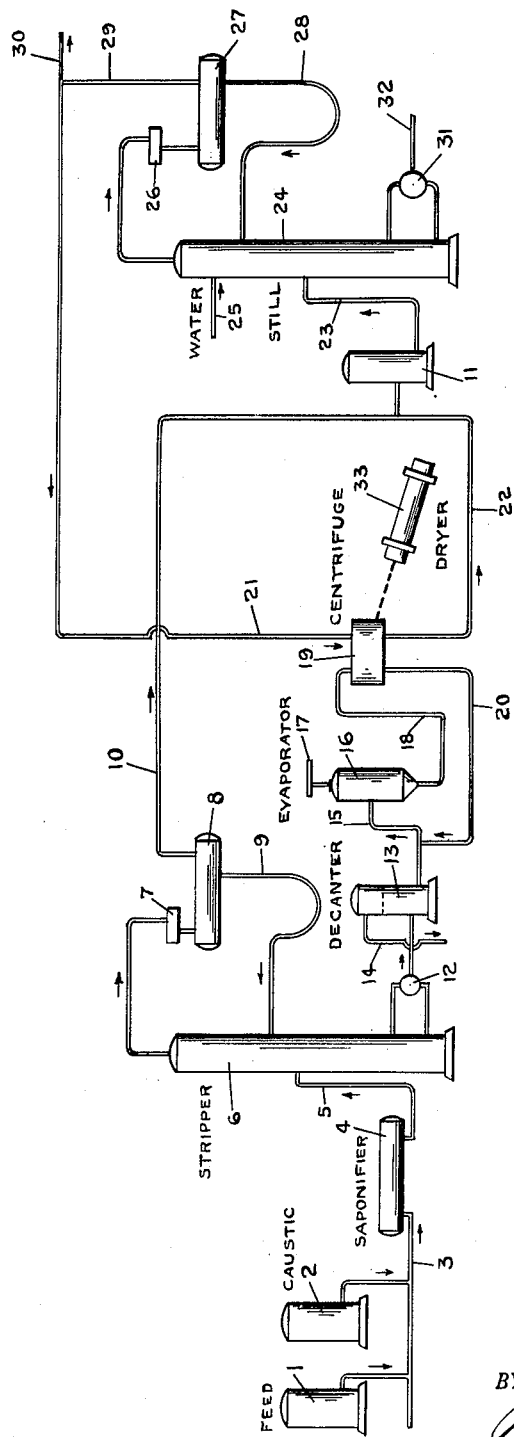

2,545,889

UNITED STATES PATENT OFFICE 2,545,889

RECOVERY OF OXYGENATED COMPOUNDS

Alexander F. MacLean, Robstown, Tex., assignor to Celanese Corporation of America, a corporation of Delaware Application November 19, 1948, Serial No. 61,001

9 Claims. (Cl. 260—452)

This invention relates to the production of purified organic compounds and relates more particularly to the separation, purification and chemical conversion of certain mixtures of organic compounds obtained when isolating the products of the vapor phase partial oxidation, with air or oxygen, of gaseous hydrocarbons such as propane, butane or mixtures thereof.

An object of this invention is the provision of an efficient and economical process for the treatment of a crude fraction comprising a mixture of methylal, methyl formate and methanol containing some acetaldehyde and propionaldehyde whereby sodium formate and methylal of a high degree of purity may be obtained.

Another object of this invention is to provide a process for the treatment of a crude fraction comprising a mixture of methylal, methyl formate and methanol containing some acetaldehyde and propionaldehyde wherein the saponification of said mixture is effected and the sodium formate obtained is separated and purified by treatment of the latter with the methylal component of the crude liquid.

Other objects of this invention will appear from the following detailed description and the accompanying drawing.

The accompanying drawing is a diagrammatic showing of the manner in which my novel process may be carried out.

The vapor phase, partial oxidation of aliphatic hydrocarbons such as propane or butane, or mixtures thereof, employing air or oxygen as the oxidizing agent, yields a complex mixture of products including formaldehyde, acetaldehyde, methanol, propionaldehyde, allyl alcohol, n-propanol, isobutanol, secondary butanol, n-butanol, acetone, methyl ethyl ketone, methylal, acrolein, tetrahydrofuran, methyl formate and other esters, formals, acetals and various oxides, as well as numerous other aliphatic compounds in varying amounts. In order to separate the complex mixture of oxidation products and to purify each of the components so that the same will be suitable for commercial use, an intricate product purification scheme is necessary. The purification involves a series of fractional distillation operations yielding a number of crude fractions each containing a plurality of compounds. One such fraction which is obtained during the process comprises a mixture of methylal, methyl formate and methanol containing a small amount of acetaldehyde and propionaldehyde. Straight fractional distillation of this mixture does not yield purified compounds since the several components of the mixture form azeotropes with each other. Accordingly, to separate the components into relatively pure compounds, some chemical treatment of the mixture must be effected in order to modify certain of the troublesome components and to convert them to non-volatile compounds.

I have now found that the components of a crude mixture of methylal, methyl formate, methanol, acetaldehyde and propionaldehyde may be effectively separated and purified methylal, methanol and alkali metal formate obtained therefrom by subjecting said mixture to saponification with an aqueous solution of an alkali metal hydroxide saponifying agent, such as sodium hydroxide or potassium hydroxide, whereby the methyl formate is saponified to yield an alkali metal formate and methanol, and the aldehydes therein are condensed to resinous materials. The reaction product obtained on completion of the saponification reaction may then be stripped to remove the volatile components consisting of methylal and methanol, which are then separated by fractional distillation. The aqueous solution of alkali metal formate, such as sodium formate, remaining is then evaporated to precipitate the major part of the sodium formate contained therein, the crystals obtained centrifuged, washed with a stream of recycled purified methylal and dried.

The washing of the crude sodium formate crystals with recycled methylal comprises an important feature of my novel process since this treatment effectively removes all color from said crystals and produces a pure white commercial product of a purity of 98% and more. The methylal, after being employed for the washing operation, is combined with the stream of crude methylal and methanol entering the fractionating tower in which the methylal and methanol separation is effected. Methylal of a purity of over 98% is obtained. The aqueous methanol separated at the base of the fractionating tower in which the methylal is purified, and from which a portion thereof is recycled to effect the washing steps may then be subjected to further distillation in order to obtain a purified methanol fraction. A part of the yield of methanol obtained is released as a product of the methyl formate saponification.

The saponification of the crude mixture is preferably effected by mixing the crude mixture with a slight stoichiometric excess of a 30 to 40% by weight aqueous solution of sodium hydroxide and effecting the saponification at a temperature of 40 to 100° C., preferably under a pressure of 0 to 50 pounds per square inch gauge. The desired saponification and the simultaneous condensation of the small amount of aldehydes present in the crude mixture is usually effected by subjecting the mixture of the crude fraction and aqueous sodium hydroxide to the above saponification reaction conditions for about 20 or more minutes. The use of higher pressures and temperature would make it possible to use shorter periods.

In order further to illustrate my invention, but without being limited thereto, the following example is given:

*Example*

Referring to the drawing, my novel process is carried out in the following manner:

1200 parts by weight per hour of the crude fraction comprising a mixture containing 67% per weight of methyl formate, 31% by weight of methylal, 1% by weight of methanol and a total of 1% by weight of acetaldehyde and propionaldehyde are continuously withdrawn from a storage vessel 1 and are mixed with 1800 parts by weight per hour of a 30% aqueous solution of sodium hydroxide withdrawn from a caustic storage tank 2, and the mixture is continuously introduced through a line 3 into a saponification reaction vessel 4. The saponification reaction is effected in reaction vessel 4 at a temperature of 50-60° C. under atmospheric pressure, the dimensions of the reaction vessel being such that the residence time therein of the mixture undergoing reaction is about 120 minutes. The reaction effects the saponification of the methyl formate and the conversion of the aldehydes to resins. The saponification reaction product obtained is passed through a line 5 and introduced into a stripping tower 6 where the volatile materials are taken overhead, condensed in a condenser 7 and passed to a dephlegmator 8. The volatiles comprise essentially methanol and methylal. A portion of the condensate is returned to the stripping column 6 through a line 9 as reflux, the remainder passing through a line 10 to a receiving vessel 11 in which the crude mixture is held prior to fractional distillation.

A crude aqueous solution of sodium formate containing oils and the resinous materials produced on condensation of the aldehydes is removed from reboiler 12 of the stripping column 6 and passed to a decanter 13 where the oils and resins are separated as an upper layer and removed through a line 14. The aqueous solution of sodium formate separating out as the lower layer in the decanter 13 is introduced by means of a line 15 into an evaporator 16 provided with a steam jet ejector 17 to produce a subatmospheric pressure of about 2 pounds per square inch absolute and the aqueous solution is evaporated therein to yield an aqueous slurry of crystalline sodium formate. The sodium formate crystalline slurry is removed at the base of evaporator 16 and is then passed through a line 18 to a centrifuge 19 where the mother liquor is centrifuged off. The mother liquor is recycled through line 20 back to evaporator 16 where further sodium formate separation is effected. The crystals in centrifuge 19 are then washed with purified recycled methylal. The purified methylal is obtained by the distillation of the crude mixture of methylal and methanol drawn from receiving vessel 11, a portion of the purified methylal being recycled after the washing. The purified methylal is introduced into centrifuge 19 by a line 21, and the wash liquor comprising methylal and the impurities washed from the crystals is returned to receiving vessel 11 where it is combined with the crude methylal and methanol mixture from dephlegmator 8.

The crude mixture of methylal and methanol, which also contains some water, is passed from receiving vessel 11 through a line 23 into a fractionating column 24 where the mixture is subjected to an aqueous extractive fractional distillation, the additional water entering the column through a line 25. The product taken overhead is purified methylal and is condensed in a condenser 26 and passed to a dephlegmator 27. A portion of the methylal is returned to still 24 through a line 28 as reflux while the remainder is removed from dephlegmator 27 through a line 29, part of the purified methylal being recycled through line 21 to centrifuge 19 for the purpose of washing the sodium formate crystals while the remainder is passed through line 30 to storage. The product in reboiler 31 is a crude mixture of methanol and water and may be passed through line 32 to another distilling column (not shown) to effect further separation. The purified washed crystals in centrifuge 19 are removed and dried at a temperature of 100° C. in a rotary drier 33. 330 parts by weight per hour of a white crystalline product of a purity of over 98% purity is obtained. About 427 parts by weight per hour of methanol and 400 parts by weight per hour of methylal of a purity of 96% are also obtained. The major part of the methanol obtained is released as a product of the saponification of the methyl formate present in the crude mixture introduced into saponifier 4 from the feed tank 1.

It is to be understood that the foregoing detailed description is given merely by way of illustration and that many variations may be made therein without departing from the spirit of my invention.

Having described my invention, what I desire to secure by Letters Patent is:

1. Process for the treatment of a crude mixture of organic compounds, which comprises reacting a mixture of organic compounds consisting essentially of methylal, methyl formate and a minor proportion of methanol with an aqueous solution of an alkali metal hydroxide to effect saponification of the methyl formate present to yield free methanol and an alkali metal formate, distilling the saponification reaction product to remove methylal and methanol therefrom, and concentrating the aqueous alkali metal formate solution to form an aqueous slurry of crystalline alkali metal formate.

2. Process for the treatment of a crude mixture of organic compounds, which comprises reacting a mixture of organic compounds consisting essentially of methylal, methyl formate and a minor proportion of methanol with an aqueous solution of an alkali metal hydroxide to effect saponification of the methyl formate present to yield free methanol and an alkali metal formate, distilling the saponification reaction product to remove methylal and methanol therefrom, separating the methylal from the methanol, concentrating the aqueous alkali metal formate solution to form an aqueous slurry of crystalline alkali metal formate, removing the mother liquor from said crystalline slurry, washing the crystals with recycled purified methylal and then drying said crystals.

3. Process for the treatment of a crude mixture of organic compounds, which comprises reacting a mixture of organic compounds consisting essentially of methylal, methyl formate and a minor proportion of methanol, and containing some acetaldehyde and propionaldehyde, with an aqueous solution of an alkali metal hydroxide to effect saponification of the methyl formate present to yield free methanol, an alkali metal formate and aldehyde condensation products, distilling the saponification reaction product to remove methylal and methanol therefrom, separating the methylal from the methanol, concentrating the aqueous alkali metal formate solution to form an aqueous slurry of crystalline alkali metal formate, removing the mother liquor from said crystalline slurry, washing the crystals with recycled purified methylal and then drying said crystals.

4. Process for the treatment of a crude mixture of organic compounds which comprises reacting a mixture of organic compounds consisting essentially of methylal, methyl formate and a minor proportion of methanol, and containing some acetaldehyde and propionaldehyde with an aqueous solution of sodium hydroxide to effect saponification of the methyl formate present to yield free methanol, sodium formate and aldehyde condensation products, distilling the saponification reaction product to remove methylal and methanol therefrom, separating the methylal from the methanol, concentrating the aqueous sodium formate solution to form an aqueous slurry of crystalline sodium formate, removing the mother liquor from said crystalline slurry, washing the crystals with recycled purified methylal and then drying said crystals.

5. Process for the treatment of a crude mixture of organic compounds which comprises reacting a mixture of organic compounds consisting essentially of methylal, methyl formate and a minor proportion of methanol, and containing some acetaldehyde and propionaldehyde with an aqueous solution of potassium hydroxide to effect saponification of the methyl formate present to yield free methanol, potassium formate and aldehyde condensation products, distilling the saponification reaction product to remove methylal and methanol therefrom, separating the methylal from the methanol, concentrating the aqueous potassium formate solution to form an aqueous slurry of crystalline potassium formate, removing the mother liquor from said crystalline slurry, washing the crystals with recycled purified methylal and then drying said crystals.

6. Process for the treatment of a crude mixture of organic compounds, which comprises reacting a mixture of organic compounds consisting essentially of methylal, methyl formate and a minor proportion of methanol and containing some acetaldehyde and propionaldehyde with an aqueous solution of sodium hydroxide to effect saponification of the methyl formate present to yield free methanol, sodium formate and aldehyde condensation products, decanting the saponification reaction product to remove oils and resins therefrom, distilling the remaining aqueous saponification reaction product to remove methylal and methanol therefrom, separating the methylal from the methanol, concentrating the aqueous sodium formate solution to form an aqueous slurry of crystalline sodium formate, removing the mother liquor from said crystalline slurry, washing the crystals with recycled purified methylal and then drying said crystals.

7. Process for the treatment of a crude mixture of organic compounds, which comprises reacting a mixture of organic compounds consisting essentially of methylal, methyl formate and a minor proportion of methanol and containing some acetaldehyde and propionaldehyde with an aqueous solution of sodium hydroxide at a temperature of 40 to 100° C. to effect saponification of the methyl formate present to yield free methanol, sodium formate and aldehyde condensation products, decanting the saponification reaction product to remove oils and resins therefrom, distilling the remaining aqueous saponification reaction product to remove methylal and methanol therefrom, separating the methylal from the methanol, concentrating the aqueous sodium formate solution to form an aqueous slurry of crystalline sodium formate, removing the mother liquor from said crystalline slurry, washing the crystals with recycled purified methylal and then drying said crystals.

8. Process for the treatment of a crude mixture of organic compounds, which comprises reacting a mixture of organic compounds consisting essentially of methylal, methyl formate and a minor proportion of methanol and containing some acetaldehyde and propionaldehyde with an aqueous solution of sodium hydroxide at a temperature of 40 to 100° C. and under a pressure of 0 to 50 pounds per square inch gauge to effect saponification of the methyl formate present to yield free methanol, sodium formate and aldehyde condensation products, decanting the saponification reaction product to remove oils and resins therefrom, distilling the remaining aqueous saponification reaction product to remove methylal and methanol therefrom, separating the methylal from the methanol, concentrating the aqueous sodium formate solution to form an aqueous slurry of crystalline sodium formate, removing the mother liquor from said crystalline slurry, washing the crystals with recycled purified methyl methylal and then drying said crystals.

9. Process for the treatment of a crude mixture of organic compounds, which comprises reacting a mixture of organic compounds consisting essentially of methylal, methyl formate and a minor proportion of methanol and containing some acetaldehyde and propionaldehyde with an aqueous solution of sodium hydroxide at a temperature of 40 to 100° C. and under a pressure of 0 to 50 pounds per square inch gauge for 20 to 200 minutes to effect saponification of the methyl formate present to yield free methanol, sodium formate and aldehyde condensation products, decanting the saponification reaction product to remove oils and resins therefrom, distilling the remaining aqueous saponification reaction product to remove methylal and methanol therefrom, separating the methylal from the methanol, concentrating the aqueous sodium formate solution to form an aqueous slurry of crystalline sodium formate, removing the mother liquor from said crystalline slurry, washing the crystals with recycled purified methylal and then drying said crystals.

ALEXANDER F. MacLEAN.

REFERENCES CITED

The following references are of record in the file of this patent:

UNITED STATES PATENTS

| Number | Name | Date |
| --- | --- | --- |
| 2,042,314 | James | May 26, 1936 |
| 2,153,526 | Walker | Apr. 4, 1939 |